Aug. 18, 1942.   R. A. W. FILMER   2,293,198
REMOTE CONTROL FOR LANDING GEAR AND FLAPS
Filed Aug. 16, 1940   7 Sheets-Sheet 1

FIG. 1.

INVENTOR.
ROBERT AUGUSTUS W. FILMER
BY
Howard T. Jeandron ATTORNEY.

Aug. 18, 1942.     R. A. W. FILMER     2,293,198
REMOTE CONTROL FOR LANDING GEAR AND FLAPS
Filed Aug. 16, 1940     7 Sheets-Sheet 2

INVENTOR.
ROBERT AUGUSTUS W. FILMER
BY
Howard T. Jeanshon  ATTORNEY.

Aug. 18, 1942.  R. A. W. FILMER  2,293,198
REMOTE CONTROL FOR LANDING GEAR AND FLAPS
Filed Aug. 16, 1940  7 Sheets-Sheet 3

INVENTOR.
BY ROBERT AUGUSTUS W. FILMER
ATTORNEY.

Aug. 18, 1942.   R. A. W. FILMER   2,293,198
REMOTE CONTROL FOR LANDING GEAR AND FLAPS
Filed Aug. 16, 1940   7 Sheets-Sheet 6

INVENTOR.
ROBERT AUGUSTUS W. FILMER
BY
Howard J. Jeandron ATTORNEY.

Patented Aug. 18, 1942

2,293,198

UNITED STATES PATENT OFFICE 2,293,198

REMOTE CONTROL FOR LANDING GEAR AND FLAPS

Robert Augustus W. Filmer, Mineola, N. Y., assignor to Air Associates, Inc., Garden City, N. Y.

Application August 16, 1940, Serial No. 352,888

14 Claims. (Cl. 244—1)

This invention relates to a remote control device for use on aircraft employing retractable landing gear and flaps, and particularly to such a device which will eliminate unintentional operation of the retractable landing gear and permit co-ordination of the landing gear and flaps.

Due to the risk of collapse of an undercarriage while the airplane is on the ground, or partially ground borne, a practice has been followed of locking the retracting mechanism so that it cannot be actuated unless the airplane is off the ground. The undercarriage is therefore made dependent upon certain conditions for its operation.

It is an object of the invention to provide an apparatus of the character described which shall be simple and rugged in construction, convenient in use, and which shall enable quick and accurate operation.

The primary object of this invention is to provide a compact and efficient control mechanism for landing gear and flaps which shall have certain precautionary features to insure safety.

It is an object of the present invention to not only lock the undercarriage against retraction while resting on the ground, but to also make the retraction of the undercarriage dependent upon the attainment of a substantial air speed by the aircraft.

It is also an object of the present invention to insure by an interlocking means the dropping of the undercarriage for landing whenever the flaps are lowered to reduce the air speed for landing.

It is likewise an object of the invention to group the controls in a single unit to simplify their use in operation.

It is also an object of the invention to permit the separation of functional operation even though the controls are normally co-ordinated.

It is also an object of the invention to indicate the position of flaps and landing gear on the control panel.

In accordance with the objects, one embodiment of the invention contemplates the provision of an automatic lock which functions as a means of preventing unintentional operation of the landing gear and is comprised of a spring pressed latch which normally restricts the movement of the landing gear retracting control member, and a wind cup which is connected to the latch member by a guide cable. When a predetermined wind pressure is attained, the wind cup will be moved backward about its pivot point. This movement is transmitted to the latch member moving it away from the control member, thus allowing the landing gear control unrestricted movement permitting it to be operated when desired by releasing the manual lock.

Another embodiment of the invention, as hereinafter disclosed, becomes apparent when and if flaps are used to reduce the air speed for landing. In practice the flap control is normally up and remains so in flight. In the particular structure upon which this invention is based, there is a clutching arrangement associated with the flap control member so that the operation of the flap is not interfered with in any way, but the dropping of the flap for retarding the air speed of the aircraft to permit landing is taken advantage of. By means of the clutching arrangement the movement of the flap downward during flight unless the clutch is released will at the same time bring the landing gear down to a landing position. And vice versa, the movement of the landing gear control upward during a take-off will, unless the flap is intentionally placed all the way down, by means of the clutch at the same time carry the flaps up.

In carrying out the features of this invention in addition or as a substitute for such means, there is provided a control member with separable handle portions which are adapted to operate separately or are locked as a matter of safety when that particular control should not be permitted to operate. More specifically, the operation of the undercarriage is dependent upon certain safety features. In both embodiments, the undercarriage is locked against retraction while ground borne, but becomes retractable after a take-off when the aircraft assumes a predetermined flying speed. This may be accomplished by an air speed meter or by a wind cup mounted on the landing gear. Also, when flaps remain down, the undercarriage is locked to prevent retraction, but in the event the flaps are purposely positioned down, the undercarriage may be retracted by a special releasing lock operable by the pilot.

With the foregoing preliminary discussion and the several objects in view, many of the attendant advantages of this invention will be readily appreciated as the same becomes better understood by reference to the following detailed description when considered in connection with the accompanying sheets of drawings wherein.

Figure 1:
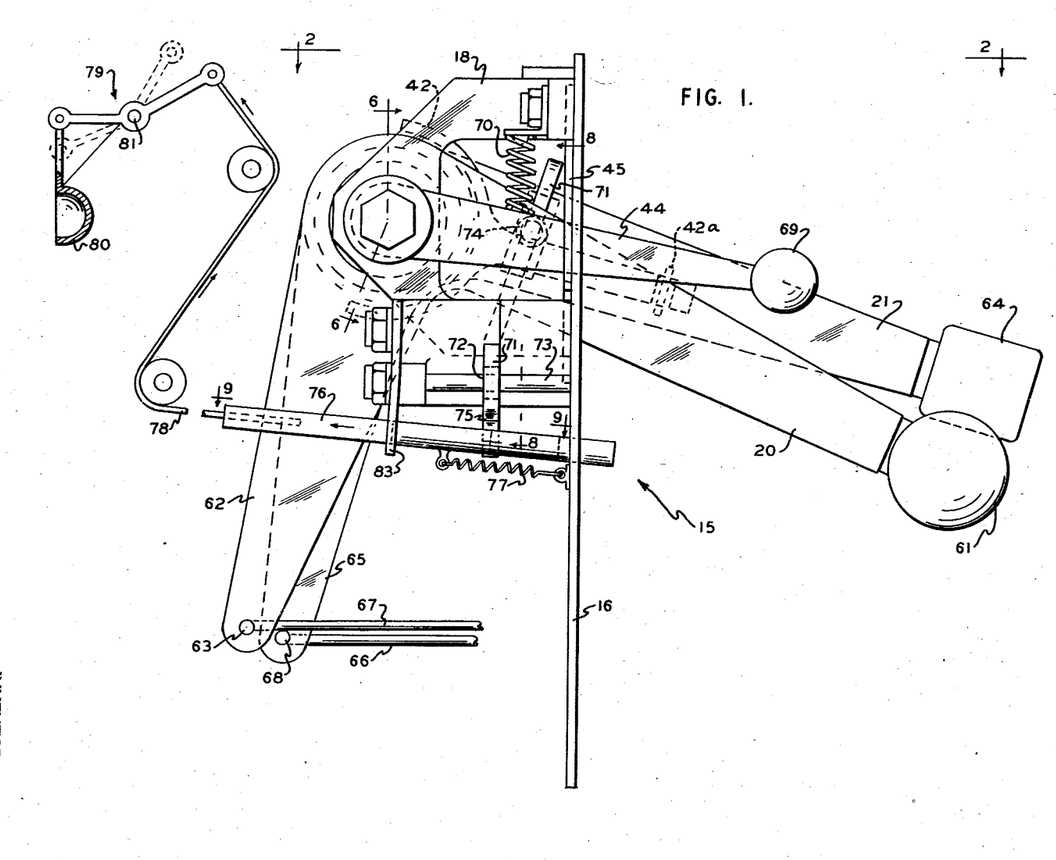
Fig. 1 is a side elevational view of the control apparatus and also illustrates a wind cup lock releasing mechanism.
Figures 2, 3, 4:
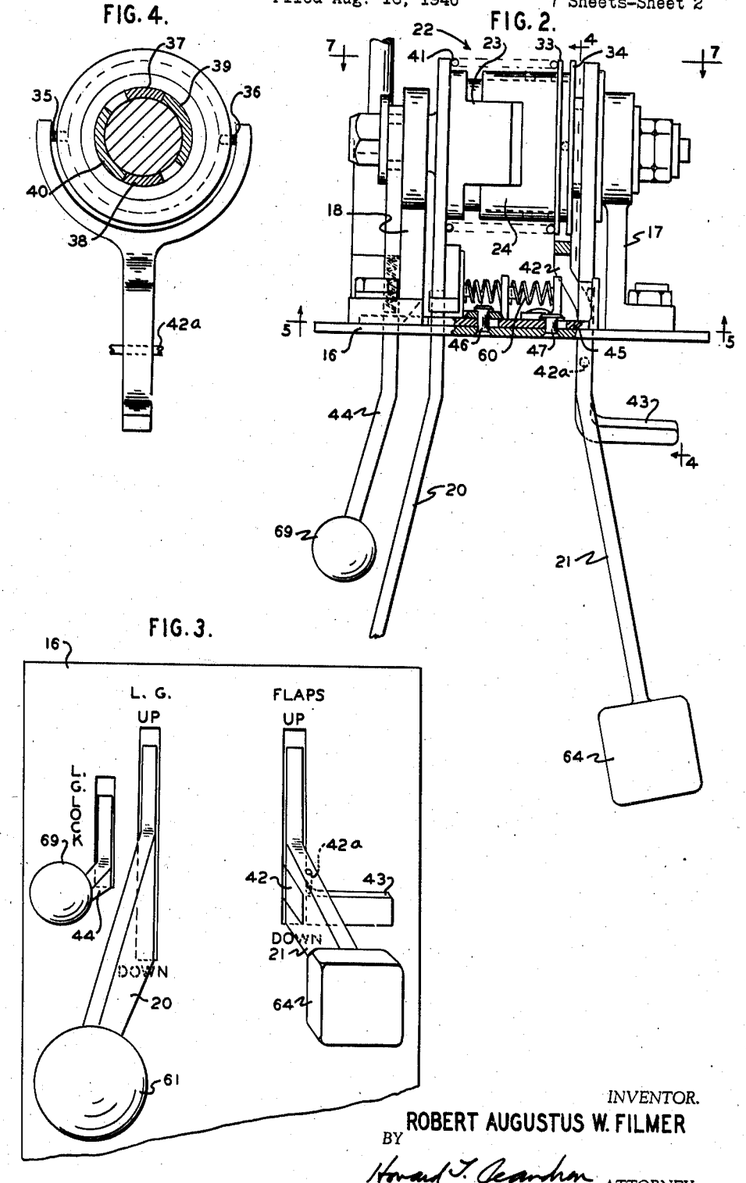
Fig. 2 is a plan view partially in section taken on a line 2—2 of Fig. 1.
Fig. 3 is a front elevational view of the control apparatus.
Fig. 4 is a cross-sectional view taken on the line 4—4 of Fig. 2 illustrating the clutching mechanism.
Figure 5:
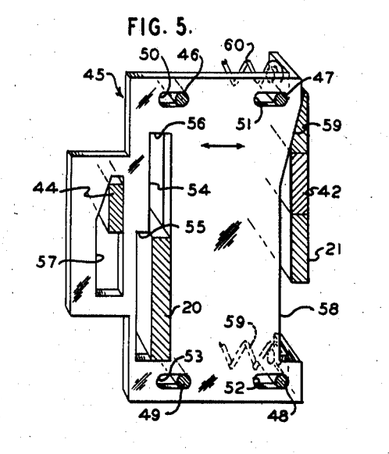
Fig. 5 is an elevational view taken on the line 5—5 of Fig. 2 illustrating the control handle actuated lock releasing plate.
Figures 6, 7, 8:
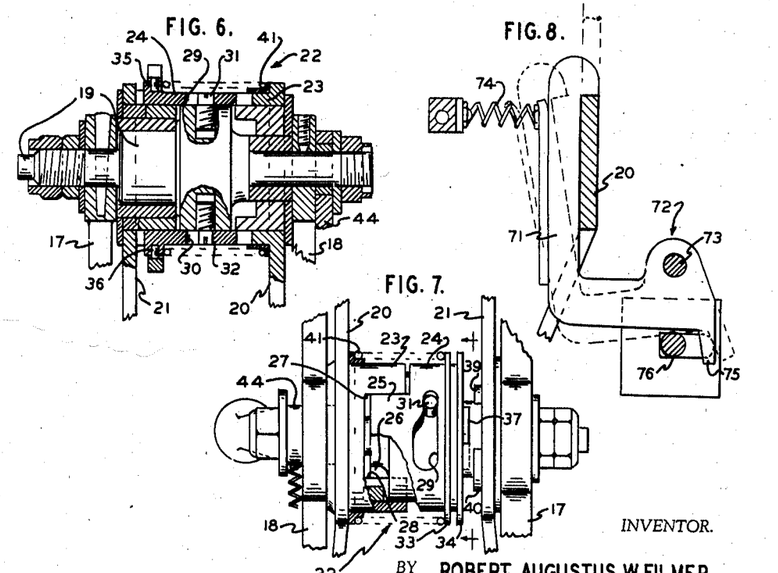
Fig. 6 is a cross-sectional view taken on the line 6—6 of Fig. 1.
Fig. 7 is a rear elevational view taken on the line 7—7 of Fig. 2.
Fig. 8 is an elevational view taken on the line 8—8 of Fig. 1 illustrating the landing gear locking means.

Referring to Fig. 1, an actuating mechanism control 15 is shown. In practice, the mechanism is designed to be attached to a flying machine of any type wherein a retractable landing gear and flaps are included. Although the landing gear and flaps are the elements for which the mechanism of the present invention are intended, they are not illustrated as they are considered to be well known art and in all cases are dependent upon a control and power means to move in two directions to retract or protract as the case may be. The mechanism 15 is comprised of a mounting plate 16 having two supporting brackets 17 and 18 mounted thereon. The brackets 17 and 18 in turn support a non-rotatable core member 19 which may be pinned thereto as shown in Fig. 6. Supported on the core member 19 and operable in a restricted angle of movement are two control arms 20 and 21. Also mounted on the core member 19 between the arms 20 and 21 is a clutch mechanism 22. The arm 20 has a hub portion 23 integrally cast therewith which is also mounted on the core member 19. The clutch mechanism 22 is comprised of a central collar member 24 having two axially positioned projections 25 and 26 which have a sliding engagement with the hub portion 23 in its axially cut-out portions 27 and 28. The central collar 24 has two opposite cams 29 and 30 in its periphery, through which a pair of follower pins 31 and 32 are affixed to the central core 19, thus affixing the collar 24 to the core 19 but permitting a rotative movement equal to the length of the cams and an axial movement equal to the width of the cams, minus the diameter of the pin. Two peripheral rings 33 and 34 are formed on the outer unbroken periphery of member 24 to provide a groove for two clutch shifting fingers 35 and 36. The member 24 also has two oppositely positioned projecting dogs 37 and 38 on the face nearest to the arm 21, while the arm 21 has two oppositely positioned projecting peripheral portions 39 and 40 of the same diameter as members 37 and 38 with which they coact. The clutch 22 is shown as disengaged in Fig. 7 and is shown as engaged in Fig. 2. The clutch is disengageable in operation by either of two operations: when the cams 29 and 30 are moved clockwise (as viewed from the left Fig. 7) by the arm 20, thus forcing the collar 24 to the left when the follower pins 31 and 32 are positioned in the narrow portion of the cams 29 and 30, and when the pins 35, 36 are used to shift the collar to the left as desired, as described hereinafter. To insure the engagement of the clutch 22 or rather the engagement of collar 24 with arm 21 a spring 41 is provided which is mounted on the periphery of the hub portion 23 and the collar 24 and attempts to force the collar 24 into engagement with arm 21 at all times. The pins 35 and 36 which are used to shift the collar 24 are a part of a Y shaped arm 42 which is pivotally mounted in the arm 21 by means of a pin 42a and has a right angle extension handle 43. In operation, sufficient finger pressure on the handle 43 to overcome the effects of spring 41 will shift the collar 24 to the left Fig. 2 and thus disengage the clutch 22. Rotatively mounted on the member 19 Fig. 6 exterior of the bracket 18 is a control arm 44 which passes through a plate 45 and the mounting plate 16 Figs. 2 and 5. The plate 45 is positioned directly behind the mounting plate 16 and held in a comparatively fixed relationship by pins 46—49 although shiftable to a small degree due to the slots 50—53 Fig. 5. The plate 45 has a two step perforation 54 through which the arm 20 passes. The arm 20 in its down position will fit into the first step 55 and in its up position rest against the second step 56 of the perforation 54. The plate 45 also has a cam slot 57 through which the arm 44 passes, the cam slot having an angular formation at the upper end. The right hand edge of plate 45 has a cut-out portion 58 which also has an angular formation 59 at its upper end. In operation, the movement of either the arm 44 or the arm 21 upward against the angular cam faces of cam slots 57 or 58 will move the plate 45 to the left, thus removing the first step 55 from above the arm 20 so that it may be moved upward when desired. The plate 45 is normally forced to the right Fig. 5 by means of the springs 59 and 60.

Figure 9:
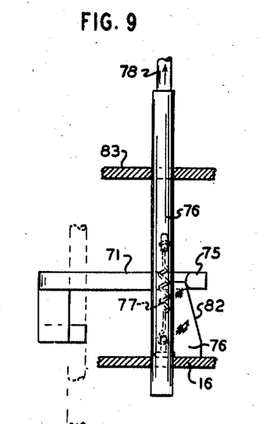
Fig. 9 is a plan view of the landing gear lock releasing rod taken on the line 9—9 of Fig. 1.

The arm 20 has a ball handle member 61 and a bell crank lever section 62 to which a rod 67 is attached at 63. The arm 21 has a square block handle member 64 and a bell crank lever section 65 to which a rod 66 is attached at 68. The arm 44 has a small ball handle member 69 and is normally held in its down position by a spring 70 as indicated in Fig. 1. A latch member 71 is provided which is pivotally mounted at 72 on a rod 73 Fig. 1. The latch 71 is normally held in engagement with the arm 20 by a spring 74 Fig. 8. The latch 71 has an extended lip 75 which is engaged by a cam face 82 of a cam rod 76. The rod 76 is held in a retracted position by a spring 77 Fig. 1, the opposite end of the rod being attached to a control cable 78 which is passed about pulleys as may be necessary and connected to a wind cup linkage 79. A wind cup 80 is the means of actuating the linkage members 79 working about a pivot point 81. In operation, the spring 77 will resist movement of the linkage and wind cup until the aircraft has attained a predetermined air speed after which the wind cup will move the cam rod 76 to the left Fig. 1. Movement of the cam rod 76 Fig. 9 will be from the position indicated away from the panel 16. The movement outward will at the same time, due to the cam face 82 moving against the extension 75 of the member 71, move the latch 71 about its pivot point 73, thus releasing the latch 71 from the arm 20, and permitting the arm 20 to be moved upward when desired. As soon as the aircraft air speed drops below the predetermined speed at which the wind cup is actuated, the spring 77 will return the rod 76 to its original position. The cam face 82 being retracted, the member 71 will be returned to its original position by the spring 74. Thus it is apparent that the instant the landing gear control lever 20 is moved to its down position it will be locked there by the latch 71.

Figure 10:
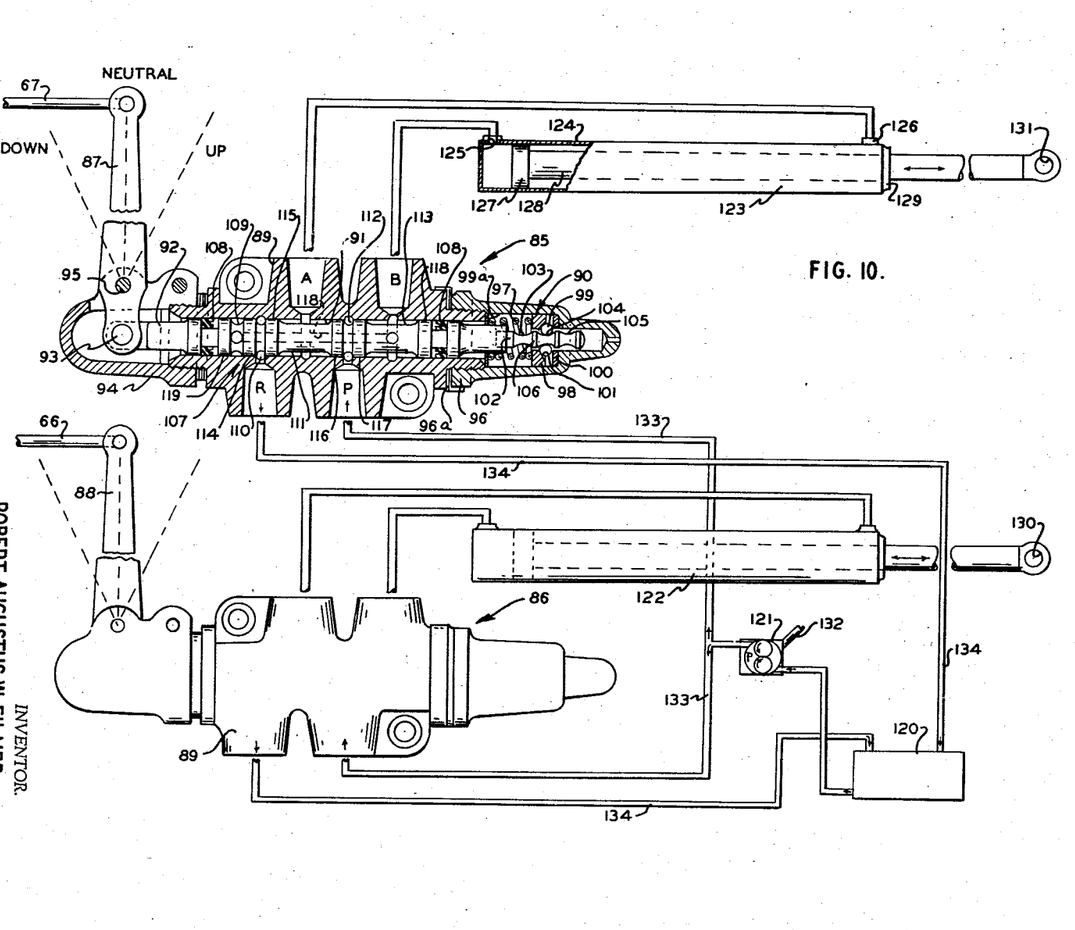
Fig. 10 is a schematic view of the controlled mechanism, with one valve shown in sectional detail.

Referring to Figs. 1 and 10 which jointly illustrate a complete hydraulic control system for the landing gear and flaps, the rods 66 and 67 are connected directly to selector valves 85 and 86 Fig. 10. The rod 67 is pivotally attached to a lever arm 87 of the valve 85 and the rod 66 is pivotally attached to a lever arm 88 of the valve 86. The valves 85 and 86 are identical in structure, being four-way, three position slide valves with a latch and lever control. The three positions are down, neutral and up as shown in Fig. 10, the four-way ports being pressure P, return R, and cylinder lines A and B. The levers 87 and 88 are the direct means of control connected to the controlling mechanism of Fig. 1, whereas a latch mechanism 90 is the means of holding any one of the three positions when one is chosen. The valve 85 is comprised of a main casting 89 with a central bore 91 and having four ports A, B, P and R all leading to peripheral grooves in the bore 91. Slidably mounted in the bore 91 to control the flow of the fluid employed is a plunger 92 which at one end is pivotally connected at 93 to the lever 87 and at the other end is controllably positioned by the latch 90. A cup shaped casting 94 is threadably secured to the main casting 89 and supports a pivot pin 95 which in turn supports the lever 87 and permits a pivotal movement thereabout. A cup shaped casting 96 with an inner bore 99A is also threadably secured to the main casting 89 and supports a latch mechanism 90 which comprises a spring 97, a cam ring 98 slidable in the bore 99A of the casting 96, ball bearing 99 and a bearing ring 100. The cam ring 98 has an annular cam face 101 which retains the ball bearings 99 against the bearing ring 100 and also presses them into one of the reduced portions of an extension selector rod 102. Shim washers 96A are provided to assist in adjusting the spring 97 so that the ball bearings 99 will be correctly positioned. The detent rod 102 has three reduced radii portions 103, 104 and 105. In operation, the latch mechanism 90 retains the ball bearings 99 in the portion 103 of the rod 102 when the control lever 87 is in its down position, and will permit the ball bearings 99 to ride over a shoulder portion 106 and retain the ball bearings 99 in the portion 104 of the rod 102 when the control lever 87 is in its neutral position, and likewise will permit the ball bearings 99 to ride over a second shoulder portion 106 and retain the ball bearings 99 in the portion 105 of the rod 102 when the control lever 87 is in its up position. Thus the latch mechanism 90 functions to define and retain any one of three desired positions. The plunger 92 in addition to the ends already described is made up of a central portion 107 having reduced portions for porting and shoulder portions to divide the ported areas. At either end within the bore 91 is a hydraulic sealing cup 108 to prevent leakage. The central portion 107 of the plunger 92 comprises the reduced radii portions 109, 110, 111, 112 and 113 which are separated from each other by shoulder portions 114, 115, 116, 117, 118 and 119. Also as a means of connecting the reduced portions 109 and 113 a central passage 118 in plunger 92 is provided which is open to both portions.

In operation with the valve lever 87 in neutral the pressure port P is connected to the portion 112 but is sealed by shoulders 116 and 117 and therefore is not connected to any other port. Likewise the return port R is connected to the portion 110 but is sealed by shoulders 114 and 115 and therefore is not connected to any other port. In similar fashion port A is connected to the portion 111 and sealed by the shoulders 115 and 116, and port B is connected to the portion 113 and sealed by the shoulders 117 and 118. Thus in a neutral position there will be a definite sealing of all ports preventing the flow of any fluid. When the valve lever 87 is moved to the down position the plunger 92 is shifted to the right so that portion 109 aligns with the return port R and portion 111 is aligned with ports A and P permitting communication between the ports, and portion 113 is still in alignment with port B. Thus the fluid pressure may pass from the port P to port A and return fluid may pass from the port B through passage 118 to the return port R. When the valve lever 87 is moved to the up position the plunger 92 is shifted to the left so that portion 111 aligns with port A and with port R permitting communication between the ports, and portion 113 aligns with port B and with port P permitting communication between the ports. Thus the fluid pressure may pass from the port P to port B and return fluid pressure may pass from the port A to return port R.

Having described the structure and operation of the valves 85 and 86 and the control unit 15, we next refer to Fig. 10 where the remainder of the hydraulic system is indicated schematically, and is comprised of a reservoir 120, a pump 121, a flap actuating cylinder 122, a landing gear actuating cylinder 123, and the connecting tubing. The cylinders 122 and 123 are identical being comprised of a cylindrical casting 124 with two ports 125 and 126 and a piston 127 mounted within the cylinder on the end of a piston rod 128. The rod 128 is passed through an end 129 of the cylinder acting as a bearing for the rod. The end of the piston rod 128 is provided with an eye 130 for attaching the flap actuating rod on cylinder 122 and the end of rod 128 is provided with an eye 131 for attaching the landing gear actuating rod on cylinder 123. In operation, the pump 121 is driven by a shaft 132 from any desirable source not shown. The pump will take fluid from the reservoir 120 supplying a pressure line 133 which leads to the pressure ports P of each valve. Assuming that the lever 87 has been moved to its right position, the pressure supply will be connected to the port B which will supply fluid pressure through the port 125 of cylinder 123 and thus move the piston 127 to the right Fig. 10 which will in turn move the landing gear connection at 131 to the desired extent. When the piston is protracted it will force any excess fluid behind the piston through the port 126 which is connected to the port A of the valve 85. Since the port A is connected to the port R the return fluid will pass into the return line 134 and thus back to the reservoir 120.

Assuming that the lever 87 has been moved to its down position, the pressure supply will be connected to the port A which will supply fluid pressure through the port 126 of cylinder 123 and thus move the piston 127 to the left Fig. 10, which will in turn move the landing gear connection at 131 to the desired extent. When the piston is retracted it will force any excess fluid in front of the piston through the port 125 which is connected to the port B of the valve 85. Since the port B is connected to the port R in this position of valve 85, the return fluid will pass into the return line 124 and thus back to the reservoir 120. Since the valve 86 is identical to the valve 85 the operation of valve 86 will be similar to the operation of the valve 85 as above described.

Figure 11:
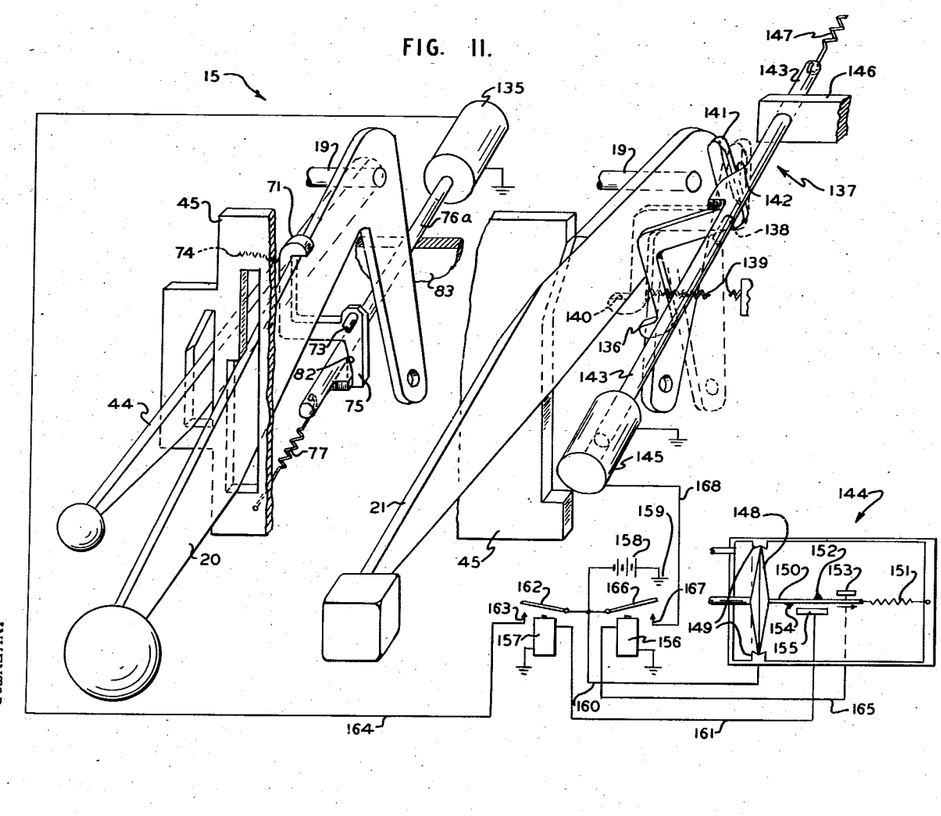
Fig. 11 is a schematic view of the control mechanism illustrating another embodiment of the invention.

Another embodiment of the invention involves the same control and actuating mechanism, with the exception that the lock releasing device is actuated by a solenoid 135 and an air speed meter 144. Also in addition, a similar solenoid 145 is electrically connected to an air speed meter 144 to actuate a latch release 137 on the flap controlling mechanism. The particular embodiment of this invention illustrated in Fig. 11 comprises all the actuating mechanism control 15 as illustrated in Fig. 1, with the exception that the cam rod 76 becomes a solenoid plunger cam rod 76A and is actuated by the solenoid 135. Also in addition, a latch 136 and release device 137 is provided to prevent operation of the flaps whenever the air speed meter 144 registers a predetermined excessive air speed. The latch member 136 is pivotally mounted at 138 and spring pressed by spring 139 to engage the arm 21 at a point 140 whenever the extension 141 of the member 136 is clear of the cam face 142 of the solenoid plunger 143, as illustrated in Fig. 11. The dotted lines illustrate the member 136 in the engaged position. The solenoid plunger 143 is slidably mounted in a solenoid 145 and a bearing member 146 and normally held in an extended position by a spring 147 attached to the end of the plunger rod 143, and to a fixed member not shown. The air speed meter 144 comprises a diaphragm 148 mounted in a frame 149, a switching rod 150 attached to the diaphragm, a spring 151 used to maintain the rod 150 in its proper relationship and two sets of contacts 152, 153, and 154, 155. The air speed meter 144, the solenoid 135, the solenoid 145, a relay 156, a relay 157, a battery 158 and the necessary connections comprise a complete operating circuit. The diaphragm is connected to the Pitot tube in the usual manner and the diaphragm 148 will respond to a predetermined air speed so that rod 150 will be removed a sufficient degree to cause terminal 154 to contact terminal 155, thus completing a circuit from a ground 159 through the battery 158 through lead 160 to the frame 149, through frame to the spring 151, through the spring 151, through the rod 150, through terminals 154, 155, through lead 161 to the relay 157, through the relay to ground. The relay 157 being actuated, a pair of terminals 162, 163 will be closed which in turn completes a circuit from the ground 159 through the battery 158 to terminal 162, through terminals 162, 163, through a lead 164 to the solenoid 135 through the solenoid to ground. The energization of the solenoid 135 will cause the retraction of the plunger 76A which in turn releases the latch member 71 as already described. In a similar manner the movement of the rod 150 an even greater degree will cause terminals 152 and 153 to contact which in turn completes a circuit from the ground 159, through battery 158, through lead 160 to the frame 149, through the frame and the spring 151 to the rod 150, through the rod and the terminals 152, 153, through a lead 165 to the relay 156 and ground actuating the relay. This in turn completes a circuit from the ground 159 through battery 158, through a pair of terminals 166, 167, through a lead 168 to the solenoid 145 to ground. The energization of the solenoid 145 will cause the retraction of the plunger 143 which in turn releases the cam face 142 from the lip 141 permitting the spring 139 to pivotally move the latch member 136 into engagement with the lever 21, thus locking it so that it cannot be moved downward. From the foregoing description it is apparent that with predetermined settings on the air speed meter the landing gear control lever 20 cannot be moved to its up position until a predetermined air speed is attained such as a fifty mile per hour air speed, and likewise the flap control lever 21 cannot be moved to its down position when an excessive air speed is indicated on the air speed meter such as a speed above one hundred miles an hour, thus preventing any damage to the flaps at high speeds, and also indicating a high rate of air speed which is far above the landing speed desired.

A still further embodiment of the invention involves much of the same control and actuating mechanism but is particularly drawn to a hydraulic control and actuation of the landing gear and flaps. In this form of the invention the control levers 20 and 21 are connected directly to a pair of primary valves 166 and 167 which are in turn connected by hydraulic tubing to a pair of secondary valves 168 and 169. The secondary valves or actuating valves are in turn connected by hydraulic tubing to their respective associated cylinders 122 and 123 Fig. 14 as in the embodiment of the invention already described. Likewise the valves 168 and 169 are connected by means of the pressure lines 133 to the pump 121 and the valves are also connected by means of the return lines 134 to a reservoir 120.

Figure 12:
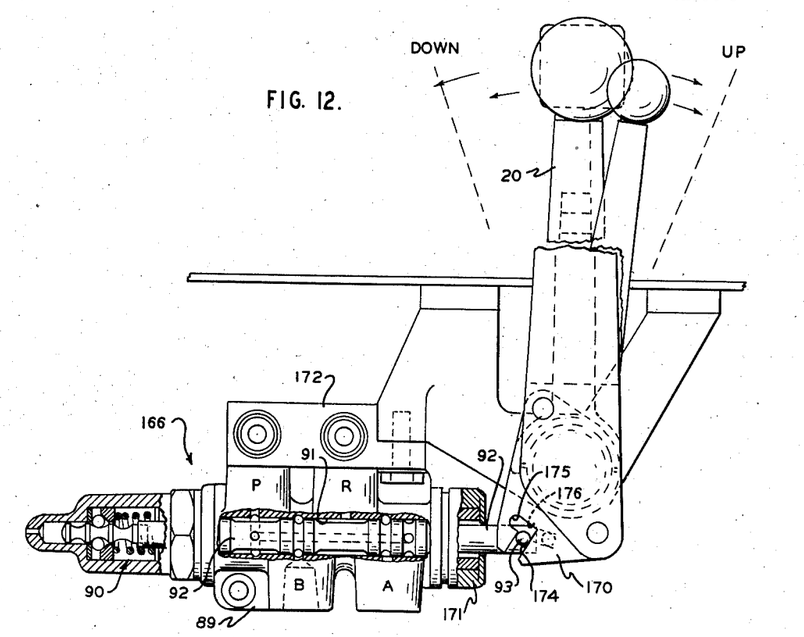
Fig. 12 is a side elevational view partially in section, illustrating hydraulic valves directly connected to the control levers.

The primary valves 166 and 167 are identical in structure being four-way, three position, slide valves with a latch and lever control. Referring to Fig. 12 the valve 166 is similar to the valve 85 of Fig. 10 comprised of a casting 89 with a central bore 91 and having four ports A, B, P and R. Slidably mounted in the bore 91 to control the flow of the fluid employed is the plunger 92 which at one end is pivotally connected at 93 to an extension 170 of the lever 20 and at the other end is controllably positioned by the latch 90 as already described in connection with valve 85 Fig. 10. All the structure of the valve 166 is similar to the valve 85 with the exception of the casting 94 of the valve 85. Threadably secured to the valve 166 is a stop nut 171 which replaces the casting 94, and is primarily a means of preventing the plunger 92 from being moved outwardly beyond a limit point. The valves 166 and 167 are secured to manifold block 172 Fig. 12 in parallel relationship so that the plungers 92 are aligned with the control levers 20 and 21, and slidably engage the extension pieces 169 and 170 which are affixed to the levers 20 and 21. The block 172 permits both pressure ports to be connected to the line 133 and both return ports to be connected to the line 134. The block 172 is in turn mounted on a pair of brackets 17A and 18A which are similar to the brackets 17 and 18 of Figs. 1 and 2. The brackets 17A and 18A support the control levers and the clutch mechanism 22 as in Fig. 6 already described. The extension piece 170 Fig. 12 is affixed to the control lever 20 by two rivets so that member 170 for all purposes becomes a part of the lever 20; likewise the extension piece 169 becomes a part of the lever 21. The piece 170 has an L-shaped cam slot 174 cut in its web section so that the pin 93 will ride freely in the cam slot and at the same time be moved forward or backward by the cam slot as the lever 20 is moved to its down or up position. The pin 93 being mounted in the plunger 92, the plunger will be moved to the same degree as the pin. It will be noted that as the pin 93 rides up the cam slot the lever 20 is moving to its down position. When the pin 93 reaches the end of the slot the lever 20 will have a small amount of lost motion due to the pin riding through the leg 175 of the L-shaped slot 174. Likewise before raising the landing gear control 20 there will be a small amount of lost motion as the pin 93 rides back the leg 175 to the upper portion of the slot 174 when it begins to move the plunger 92. The flap control lever 21 also has an extension piece 169 affixed thereto in the same fashion, but the cam slot 176 is I shaped as indicated in dotted lines Fig. 12 and does not have any lost motion in operation. The operation of the valves 166 and 167 is as already described for valve 85, being operative in either a right or left position and inoperative in its neutral position.

Figure 14:
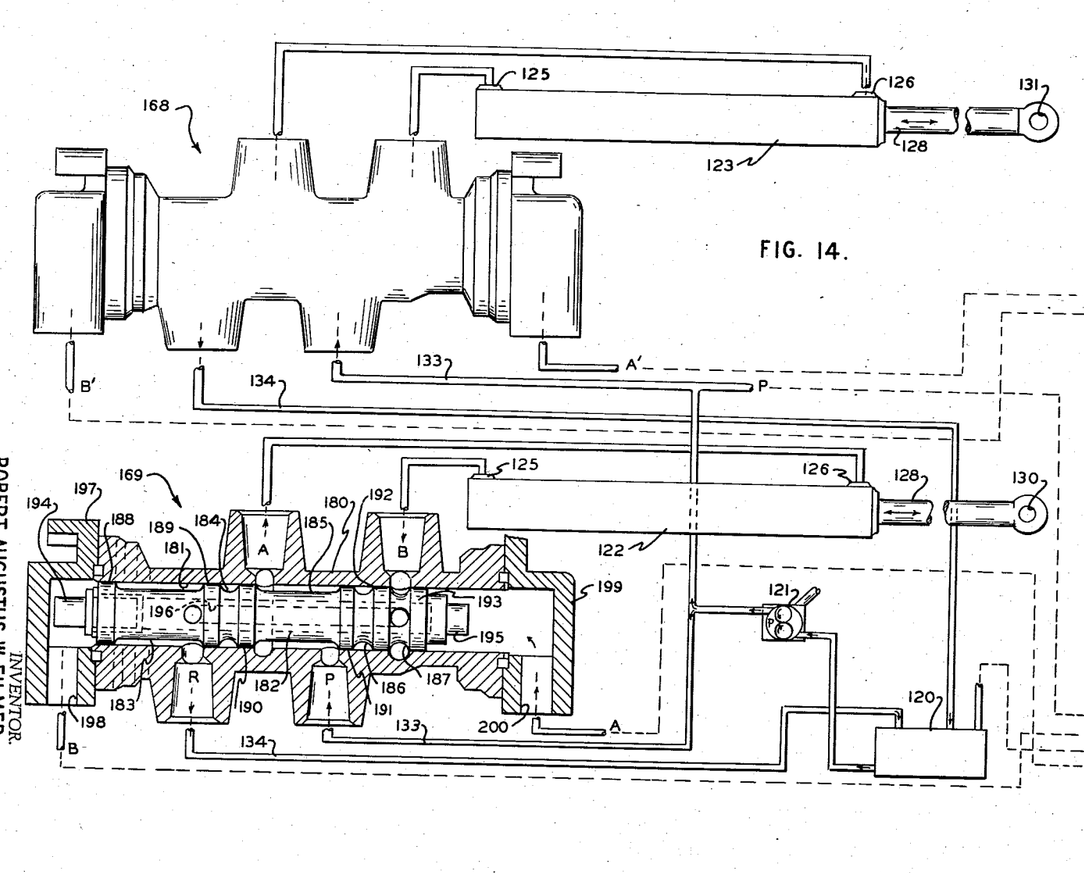
Fig. 14 is a schematic illustration of the hydraulic system as connected to the apparatus shown in Fig. 13, and also illustrates in detail the actuating valves.

Referring to Fig. 14, valves 168 and 169 are four-way, two position, slide valves, identical in all features. The valve 169 is illustrated in detailed sectional view and is comprised of a main casting 180 with a central bore 181 and having four ports A, B, P and R all leading to peripheral grooves in the bore 181. Slidably mounted in the bore 181 to control the flow of the fluid employed is a selector plunger 182. The selector plunger 182 has five grooves 183, 184, 185, 186 and 187 and six dividing shoulder portions 188, 189, 190, 191, 192 and 193. At either end of the selector plunger 182 is an extension stop member 194 and 195 of reduced radius. Also as a means of connecting the reduced portions 183 and 187 a central passage 196 in plunger 182 is provided which is open to both portions. An end casting 197 is affixed to one end of the valve 169 and has a port 198 leading to the reduced radius 194 of the plunger 182, while an end casting 199 is affixed to the other end of the valve 169 and has a port 200 leading to the reduced radius 195 of the plunger 182.

Figure 13:
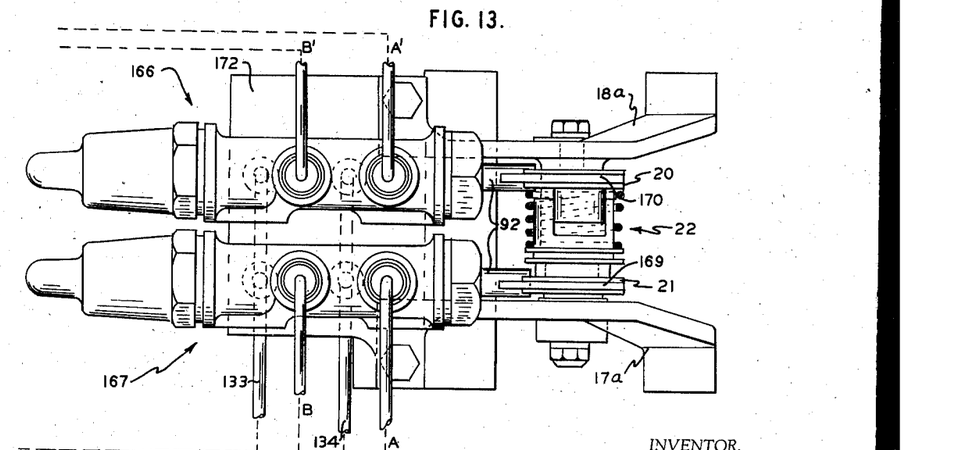
Fig. 13 is a bottom view of the mechanism shown in Fig. 12, with the connecting tubes indicated.

Figs. 13 and 14 taken together constitute a complete hydraulic system, and in operation the pump 121 is supplying pressure through line 133 to all valves. When the flap control lever 21 is moved to an up position, the plunger 92 is moved inward by the lever 21 and "B" port is connected to "return"; also "A" port is connected to "pressure." Since "A" port of the valve 167 is connected to the port 200 of the valve 169, pressure will be supplied to the end 195 of the plunger 182 of the valve 169 forcing it to the left to the position illustrated in Fig. 14, while any return fluid will be forced through the port 198 back to the "B" port of the valve 167 and thence to the "return" port and through the return line 134 to the reservoir 120. In the event the lever 21 is moved to a down position Fig. 12 the plunger 92 will be moved outward by the lever 21. Since pressure is being supplied to the "pressure" port of valve 167, the plunger 92 will connect pressure to the "B" port and "return" will be connected to the "A" port. Since "B" port of the valve 167 is connected to the port 198 of the valve 169 pressure will be supplied to the end 194 of the plunger 182 of the valve 169 forcing it to the right Fig. 14, while any return fluid will be forced through the port 200 back to the "A" port of the valve 167 and thence to the "return" port and through the return line 134 to the reservoir 120. The operation of the lever 20 will in exactly the same manner and relationship effect the operation of the valve 166 which will in turn effect the operation of the valve 168 exactly as the valve 169 was effected under similar conditions. It is apparent that the valves 168 and 169 will in operation assume either of two positions depending upon the actuation of the primary valves 166 and 167. In the event the valve 169 Fig. 14 has assumed the position indicated the pressure supply may be traced from the pump 121, line 133, to the "pressure" port of the valve 169, around the reduced radius portion 185 to the port "A" and on to the port 126 of the flap control cylinder 122 causing the plunger 128 to be retracted. In the event the valve 169 Fig. 14 has assumed an opposite position to that indicated the pressure supply may be traced from the pump 121, line 133, to the "pressure" port of the valve 169, around the reduced radius portion 185 to the port "B" and on to the port 125 of the flap control cylinder 122 causing the plunger 128 to be protracted. The operation of the valve 168 which is identical to valve 169 will be similar under both operating positions.

The embodiment of the invention herein disclosed is merely illustrative and may be modified and departed from in many ways without departing from the spirit and scope of the invention as pointed out in and limited solely by the appended claims.

What is claimed is:

1. A control device for the mechanism of a retractable landing gear of aircraft comprising a control member having a first position for retraction and a second position for protraction of said landing gear, a locking means movable into and out of the path of said member from its second into its first position, resilient means in connection with said locking means and tending to shift said locking means into said path, and releasing means responsive to wind pressure and in operative relation to said locking means so as to shift said locking means out of said path when the wind pressure exceeds a predetermined minimum.

2. A device as claimed in claim 1, wherein said releasing means comprises a pivotally mounted wind cup, a member shiftable in a predetermined direction and including a cam face in engagement with the locking means, said cam face being so shaped as to urge said locking means into one of its end positions when said member is shifted in said direction, a connection between said wind cup and said member to transmit movement of the cup to the member, and a spring in engagement with said member tending to shift said member in the opposite direction.

3. A control device for the mechanism of a retractable landing gear of aircraft comprising a control member having a first position for retraction and a second position for protraction of said landing gear, a first locking means movable into and out of the path of said member from its second into its first position, a second locking means movable into the path of said member when the latter is in its second position, two resilient means tending to shift said locking means respectively into said path, releasing means responsive to wind pressure and in operative relation to said first locking means so as to shift the latter out of said path when the wind pressure exceeds a predetermined minimum, and a hand actuated member in operative relation to said second locking means to withdraw it from said path.

4. A control device for the landing mechanism of aircraft including a retractable landing gear and wing flaps comprising a first control member having a first position for retraction and a second position for protraction of said landing gear, a first and a second locking means movable into and out of the path of said member from its second into its first position, resilient means tending to shift said locking means into said path, releasing means responsive to wind pressure and in operative relation to said first locking means so as to shift the latter out of said path when the wind pressure exceeds a predetermined minimum, a second control member for operating said flap mechanism, and a connection between said second control member and said second locking means whereby said second locking means is shifted out of said path when said second control member is actuated to set said flaps from braking position to normal flight position.

5. A control device for a landing mechanism of aircraft including a retractable landing gear and wing flaps comprising a first control member having a first position for retraction and a second position for protraction of the landing gear, a second control member having a first position for movement of the flaps into normal flight position and a second position for movement of the flaps into braking position, a first locking means movable into and out of the path of said first control member from its second into its first position, first resilient means tending to shift said first locking means into said path, releasing means responsive to wind pressure and in operative relation to said first locking means so as to shift said locking means out of said path when the wind pressure exceeds a predetermined minimum, a second locking means movable into and out of the path of said second control member from its first into its second position, second resilient means tending to shift said second locking means out of the path of the second control member, and an actuating member in operative relation to said second locking means and responsive to wind pressure so as to protract said second locking means into the path of said second control member when the wind pressure exceeds a predetermined value higher than said minimum.

6. A control device for a landing mechanism of aircraft including a retractable landing gear and wing flaps, comprising a first and a second control member for the operation of the landing gear and said flaps respectively, each member being movable between a first position for raising and a second position for lowering the parts to be respectively controlled by the member, a releasable coupling between said members, a first and a second spring-provided locking means respectively movable into and out of the path of said first control member from its second to first position and of said second control member from its first to second position, a first and a second actuating member responsive each to a different predetermined wind pressure and being in operative relation to said first and second locking means respectively, said actuating members being so constructed and arranged as to shift said locking means against the restraint of their springs respectively out of and into the path of the coordinate control member.

7. A control device as claimed in claim 6 wherein each of said actuating members includes an electromagnetic means for movement in the opposite direction further comprising a wind meter including a diaphragm exposed to the wind pressure, a contact member movable with said diaphragm and having two current-conducting contacts, and countercontacts electrically connected to said electromagnetic means respectively, said countercontacts being staggered in relation to each other and coordinate to said contacts respectively so that upon increasing wind pressure the countercontact associated with the electromgnetic means of the first actuating member will be engaged by its coordinate contact at a lower wind pressure than the other countercontact.

8. A control device for a landing mechanism of aircraft including a retractable landing gear and wing flaps comprising a first and a second control member, for the operation of the landing gear and said flaps respectively, each member being movable in one direction for raising and in another direction for lowering the parts to be controlled by the respective member, a first and a second automatic locking means in operative relation to said members respectively, so as to prevent movement of the first control member in said one direction and of the second control member in said other direction, and a wind pressure responsive device including a member movable distances from a zero position according to wind pressure values, and a first and a second operative connection between said last-mentioned member and said locking means so as to cause withdrawal of said first locking means from locking position when a predetermined lower wind pressure value is exceeded and to cause a protraction of said second locking means into locking position when a predetermined higher wind pressure value is exceeded.

9. A control device for a landing mechanism of aircraft including a retractable landing gear and wing flaps comprising a first and a second control member for the landing gear and for the wing flaps respectively, each member being movable in one direction for raising and in another direction for lowering the parts to be controlled by the respective member, a first and a second locking means in operative relation to said first control member to prevent its movement in said one direction, resilient means tending to shift said locking means into locking position, wind pressure responsive means in operative connection with said first locking means to withdraw it from locking position when the wind pressure exceeds a predetermined value, an operative connection between said second control member and said second locking means to withdraw the latter from locking position when the second control member is moved in said one direction, and a manually operated other member in connection with said second locking member to withdraw it from locking position when said second control member is in its position at the end of its movement in said second direction.

10. A device as claimed in claim 9 wherein said two control members and said manually operated member are three levers pivoted about the same axis, said second locking means comprising a movable plate parallel to said axis, stationary guiding means in engagement with said plate to restrict its movability to a direction parallel to said axis, and a spring in engagement with said plate and tending to shift it into one end position, said plate having two cam faces and a slot with a shoulder intermediate its ends, said first control lever being passed through said slot and in engagement with said shoulder so as to be prevented from being raised when the plate is in said end position, said second control lever and said third lever being in engagement with said cam faces respectively, and said cam faces being so shaped that the plate will be shifted against the restraint of said spring when said second or said third lever is raised whereby said first lever will be disengaged from said shoulder.

11. A control device for a landing mechanism of aircraft including a retractable landing gear and wing flaps, comprising a first and a second control member for the landing gear and for the wing flaps respectively, each member being movable in one direction for raising and in another direction for lowering the gear and flaps controlled by the respective member, locking means in operative relation to said first control member to prevent its movement in said one direction, resilient means tending to shift said locking means into locking position, wind pressure operated means in connection with said locking means to withdraw it from locking position when the wind pressure exceeds a predetermined value, a releasable coupling between said first and said second control member, and a spring and a hand operated member in connection with said coupling for engaging and disengaging it respectively.

12. A control device for a landing mechanism of aircraft including a retractable landing gear and wing flaps, comprising a first and a second control member for the landing gear and for the wing flaps respectively, each member being movable in one direction for raising and in another direction for lowering the gear and flaps controlled by the respective member, locking means in operative relation to said first control member to prevent its movement in said one direction, resilient means tending to shift said locking means into locking position, wind pressure operated means in connection with said locking means to withdraw it from locking position when the wind pressure exceeds a predetermined value, and a releasable coupling between said first and said second control member, said coupling including a bipartite cam mechanism, one of which parts being stationary, the other part being movable and permanently connected with one of the control members and embodying means to couple it with said other control member, and the cam face of said cam mechanism being so shaped that said control members will be disconnected when the first control member is at the end of its movement in the one direction, and that they may be connected at the end of the movement in the other direction.

13. A device as claimed in claim 12 wherein said coupling further comprises a spring in engagement with said movable cam mechanism part and tending to shift it into connection with said second control member, and a manually operated means in engagement with said movable cam mechanism part and adapted to disconnect it from said second control member.

14. In a control device of the type described, the combination of a stationary shaft, a first and a second lever spaced from each other and pivoted on said shaft each of said levers including coupling dogs arranged peripherally with respect to said shaft and facing each other, a coupling sleeve axially shiftable and turnable on said shaft between said levers and having coupling dogs at its ends, the dogs of the one side of the sleeve being in permanent engagement with those of the first lever, the dogs on the other side of the sleeve being adapted to engage those of the second lever when the sleeve is shifted towards the latter and to be disengaged when the sleeve is shifted in the opposite direction, a cam slot in said sleeve, a pin secured to said shaft and in engagement with said slot, a spring in engagement with said sleeve and tending to shift it into engagement with said second lever, said cam slot being so formed as to shift said sleeve owing to the engaging pin towards the first lever at the end of the latter's turning in one direction and to permit the spring to shift the sleeve towards the second lever at the end of the turn of the first lever in the opposite direction.

ROBERT AUGUSTUS W. FILMER.